May 19, 1970   G. M. GRUSIN ETAL   3,512,594
BATHROOM SCALE
Filed March 15, 1968
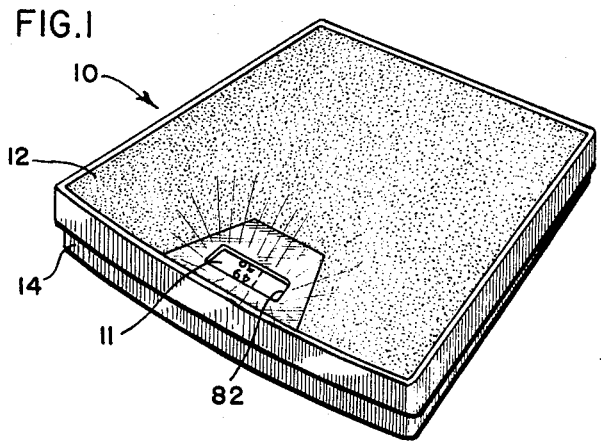
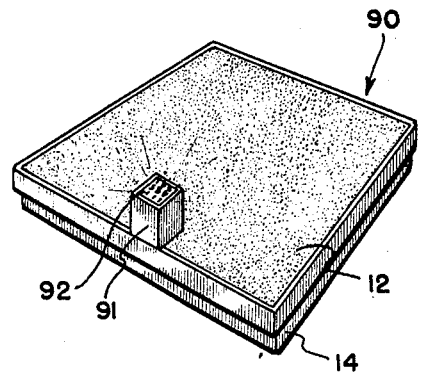
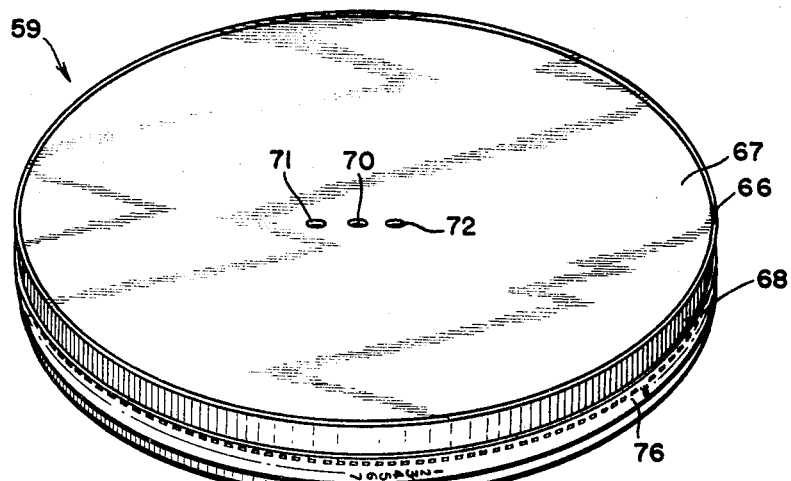
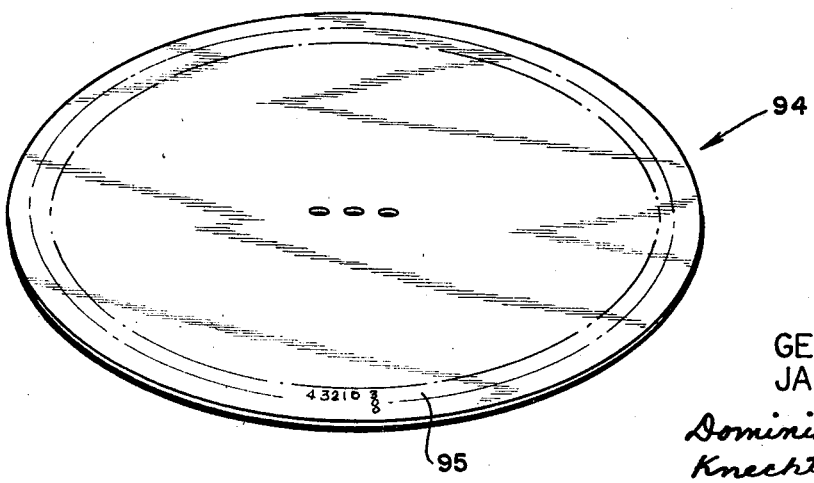
INVENTORS
GERALD M. GRUSIN
JAMES E. LOGAN
Dominik, Stein &
Knechtel
ATTYS.

May 19, 1970 G. M. GRUSIN ET AL 3,512,594
BATHROOM SCALE

Filed March 15, 1968 4 Sheets-Sheet 2

INVENTORS
GERALD M. GRUSIN
JAMES E. LOGAN

Dominik, Stein &
Knechtel
ATTYS.

May 19, 1970
G. M. GRUSIN ETAL
3,512,594
BATHROOM SCALE
Filed March 15, 1968
4 Sheets-Sheet 3
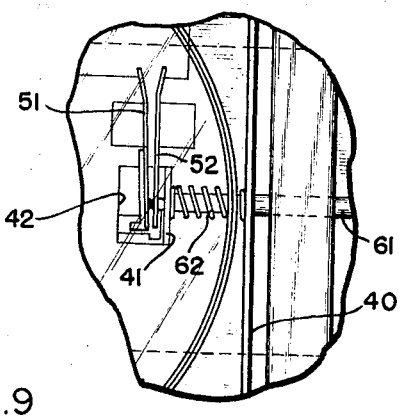
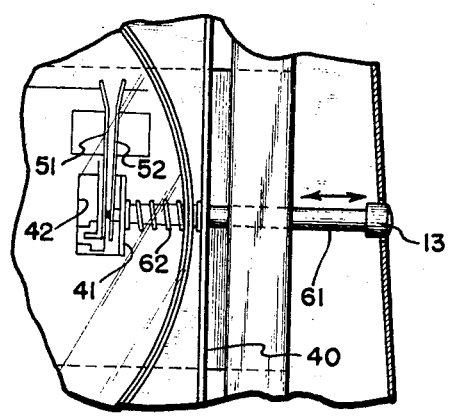
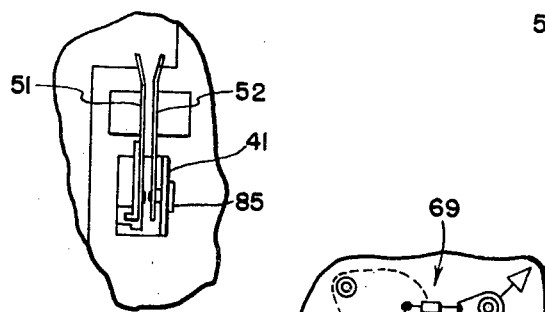
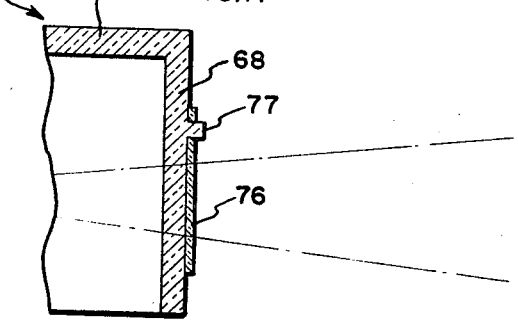
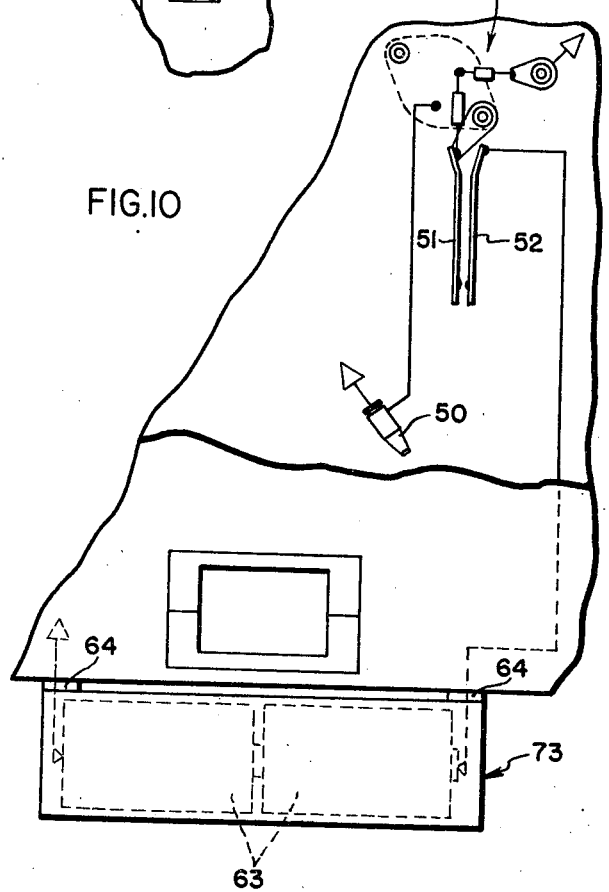
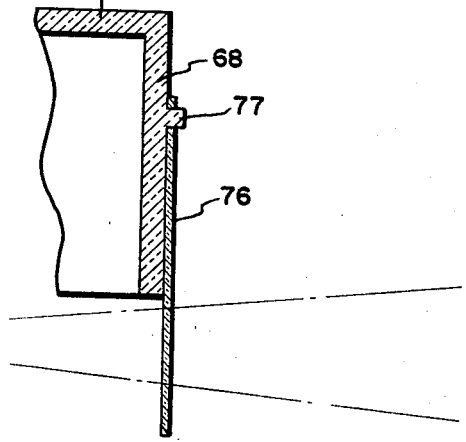
INVENTORS
GERALD M GRUSIN
JAMES E LOGAN
Dominik, Stein &
Knechtel
ATTYS.

May 19, 1970　　　　　G. M. GRUSIN ETAL　　　　3,512,594
BATHROOM SCALE
Filed March 15, 1968　　　　　　　　　　　　　4 Sheets-Sheet 4
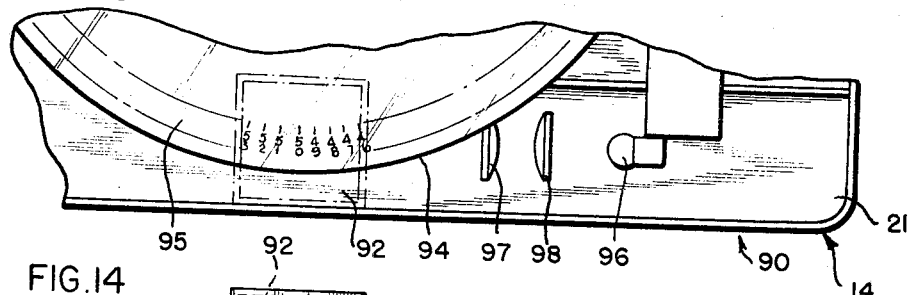
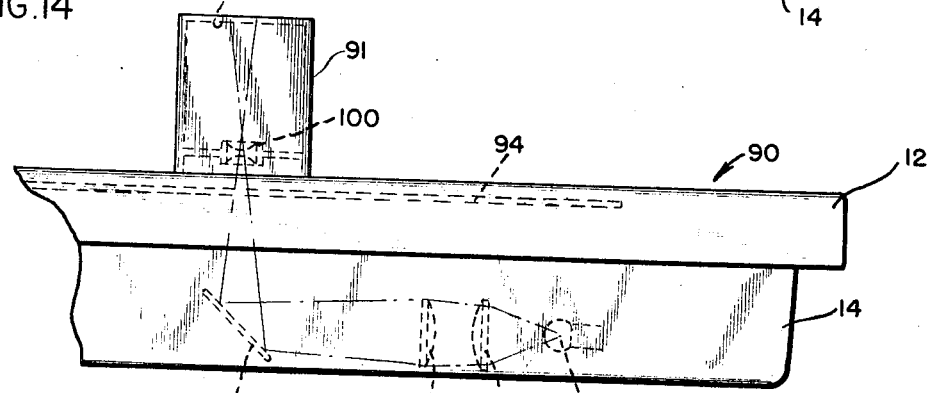
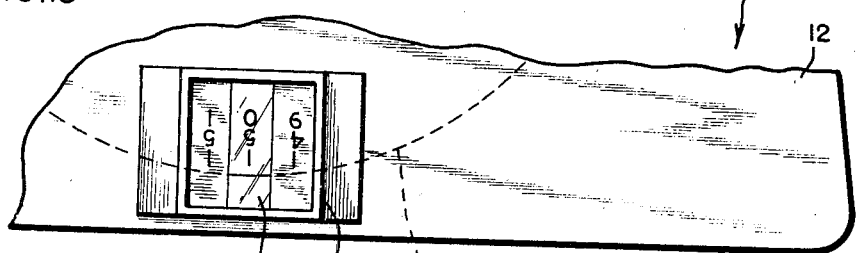
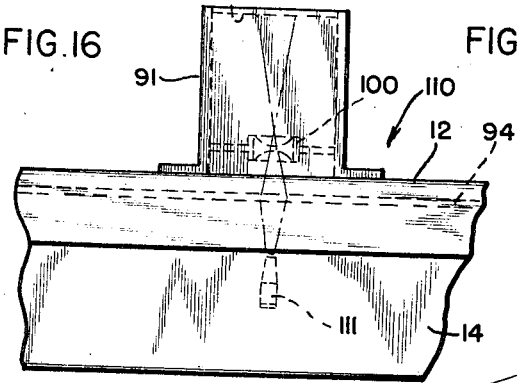
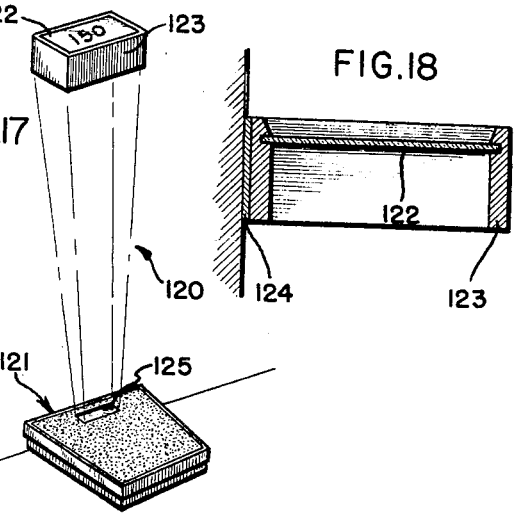
INVENTORS
GERALD M. GRUSIN
JAMES E. LOGAN
Dominik, Stein &
Knechtel　　ATTYS.

United States Patent Office 3,512,594
Patented May 19, 1970

3,512,594
BATHROOM SCALE
Gerald M. Grusin, 400 W. Deming Place 60614, and
James E. Logan, 6812 N. Ashland Ave. 60626, both
of Chicago, Ill.
Filed Mar. 15, 1968, Ser. No. 713,361
Int. Cl. G01g 23/32
U.S. Cl. 177—178   17 Claims

ABSTRACT OF THE DISCLOSURE

A bathroom scale which includes a projected dial indicator system that is constructed using, in most cases, standard components that are readily available on the open market. The dial read-out is in the form of numerals, and each pound weight is numerically indicated. The dial indicia is magnified and projected as large, legible numerals onto a projection screen which, in a preferred embodiment of the invention, is mounted flush with the top surface of the scale's platform. The projected dial system of the bathroom scale, furthermore, is adapted to be activated by means of a push-button switch so that the dial can be readjusted to zero setting, without influencing the operation of the weight mechanism.

---

This invention relates, in general, to bathroom scales and, in particular, to an improved bathroom scale having a projected dial system adapted to project an enlarged, illuminated numerical weight indication onto a projection screen, so that a person weighing himself can more easily and more accurately read and determine his indicated weight.

One principal objection of most presently available bathroom scales is that it is difficult to read the indicated weight, because the dial indicators are too small, or the indicia on them is not legible or lighted sufficiently so that it can be easily read. This objection can be easily overcome by simply providing a large size, well-lighted dial indicator with more legible indicia, however, this is more easily said than done. In most cases, the overall size of the bathroom scale would have to be substantially enlarged in order to accommodate a large dial indicator. Inasmuch as today's women are extremely style conscious, it is generally found that they will not accept or purchase a bathroom scale which is overly large or is not attractively styled. Such scales will not blend in with the decor of a room. Accordingly, the aesthetic appeal of a bathroom scale is of greater importance to a manufacturer than its readability, since he can merchandise more of the attractive bathroom scales, even though they are more difficult to read, than he can those which are relatively easy to read but are less attractive.

As always, in a competitive field, manufacturers have been devoting a considerable amount of time and money to designing a bathroom scale which is both attractively styled and easy to read, but yet compact, so that it does not stand out like a sore thumb or detract from the decor of a room. In this respect, these manufacturers further would like to develop a new dial indicator system which will fit into a housing no larger than the ones they are presently using and which will function with the existing weight mechanism so that the latter does not have to be completely redesigned. It will be appreciated that redesigning and retooling a new weight mechanism would entail a considerable expense.

Projected dial indicator systems have been employed in numerous different types of devices, and many manufacturers have attempted to incorporate such a system into a bathroom scale. Most if not all, of these attempts, however, have been unsuccessful for one reason or another.

In view of the numerous advantages which can be derived from a projected dial indicator system, it would provide a manufacturer a great competitive, and therefore economic, advantage over other bathroom scale manufacturers if he could successfully incorporate such a system into a bathroom scale, particularly, if the system could be successfully incorporated into and used with its existing housing and weight mechanism, with little or no modification to them.

Accordingly, it is an object of the present invention to provide improved bathroom scales.

More particularly, an object is to provide improved bathroom scales having a projected dial system.

Another object is to provide improved bathroom scales having a projected dial system which is constructed in a fashion such that its existing housings and weight mechanisms can be used, with little modification to them.

Still another object is to provide a bathroom scale having a projected dial system arranged and constructed in a fashion such that an enlarged, illuminated numerical weight indication can be projected onto a projection screen which is mounted flush with the top surface of the scale's platform.

Still another object is to provide improved bathroom scales having a projected dial system which is adapted to be activated in a fashion such that the dial can be re-adjusted to zero setting, without influencing the operation of the weight mechanism.

A still further object is to provide an improved bathroom scale having a dial read-out in the form of numerals, with every pound weight being numerically indicated. In this respect, it is further contemplated that half-pound weights can be indicated graphically, if desired.

A further object is to provide a bathroom scale of the above type which uses a projection lamp which, for all practical purposes is of permanent life.

Other objects of the invention will in part be obvious and will in part appear hereinafter.

The above objectives are accomplished with a bathroom scale which includes a projected dial indicator system that is constructed using, in most cases, standard components that are readily available on the open market. In addition, the system is incorporated into an existing housing and is adapted to function with a known type of weight mechanism, with little modification to them. The dial read-out is in the form of numerals, and every pound weight is numerically indicated so that the person using the scale can easily and quickly determine his weight without the necessity of interpreting and/or interpolating a slide rule-like dial of the type presently generally used. Half-pound weights also can be indicated graphically, if desired. The dial indicia is magnified and projected as large, legible numerals onto a projection screen which, in a preferred embodiment of the invention, is mounted flush with the top surface of the scale's platform. The projection screen therefore does not detract from the aesthetic appeal of the scale and, furthermore, does not present an obstruction over which people can trip or which will interfere with storing the scale. A projector lamp which, for all practical purposes, is of permanent life is used so that it need not be replaced, and the latter preferably is powered by means of a source of stored power, such as batteries. The projected dial system of the bathroom scale, furthermore, is adapted to be activated by means of a push-button switch so that the dial can be readjusted to zero setting, without influencing the operation of the weight.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 1 is a perspective view of a bathroom scale constructed in accordance with a first and preferred embodiment of the invention;

FIG. 2 is a perspective view of a bathroom scale constructed in accordance with a second embodiment of the invention;

FIG. 3 is a perspective view of the drum-like dial used in the bathroom scale of FIG. 1;

FIG. 4 is a perspective view of the disc-shaped dial used wtih the bathroom scale of FIG. 2;

FIG. 7 is a partial top plan view, illustrating the manner in which the contacts thereof for energizing the lamp of the projection system are closed, when a weight is applied to the scale's platform;

FIG. 8 is a partial top plan view generally like FIG. 7, illustrating the manner in which the same contacts are operated by means of a push-button to permit the scale to be readjusted to zero setting;

FIG. 9 is a partial top plan view like FIGS. 7 and 8, illustrating the same contacts and the manner in which one of them is positionally supported with respect to the other contact;

FIG. 10 is a partial top plan view generally illustrating the manner in which a power pack can be coupled to the scale for energizing its projection system and further illustrating a voltage regulator which, in some cases, can be advantageously used;

FIG. 11 is a partial sectional view of the drum-like dial of FIG. 3, illustrating the manner in which a film strip is affixed to and supporting by it;

FIG. 12 is a partial sectional view of the drum-like dial of FIG. 3, illustrating an alternative manner in which the film strip can be affixed to and supported by the dial;

FIG. 13 is a partial top plan view of the scale of FIG. 2 with its platform removed, illustrating the dial and the dial projection system thereof;

FIG. 14 is a partial end plan view of the scale of FIG. 2 llustrating the manner in which the numerical weight indications are projected onto the projection screen thereof;

FIG. 15 is partial top plan view of the scale of FIG. 2 llustrating the manner in which the numerical weight indications appear on the projection screen;

FIG. 16 is a partial end plan view generally like FIG. 14 illustrating an alternative light source and projection system;

FIG. 17 is a perspective view of a bathroom scale having a detached and elevated projection screen; and FIG. 18 is a sectional view of the housing supporting the projection screen.

Similar reference characters refer to similar parts throughout the several views of the drawings.

Figure 5:
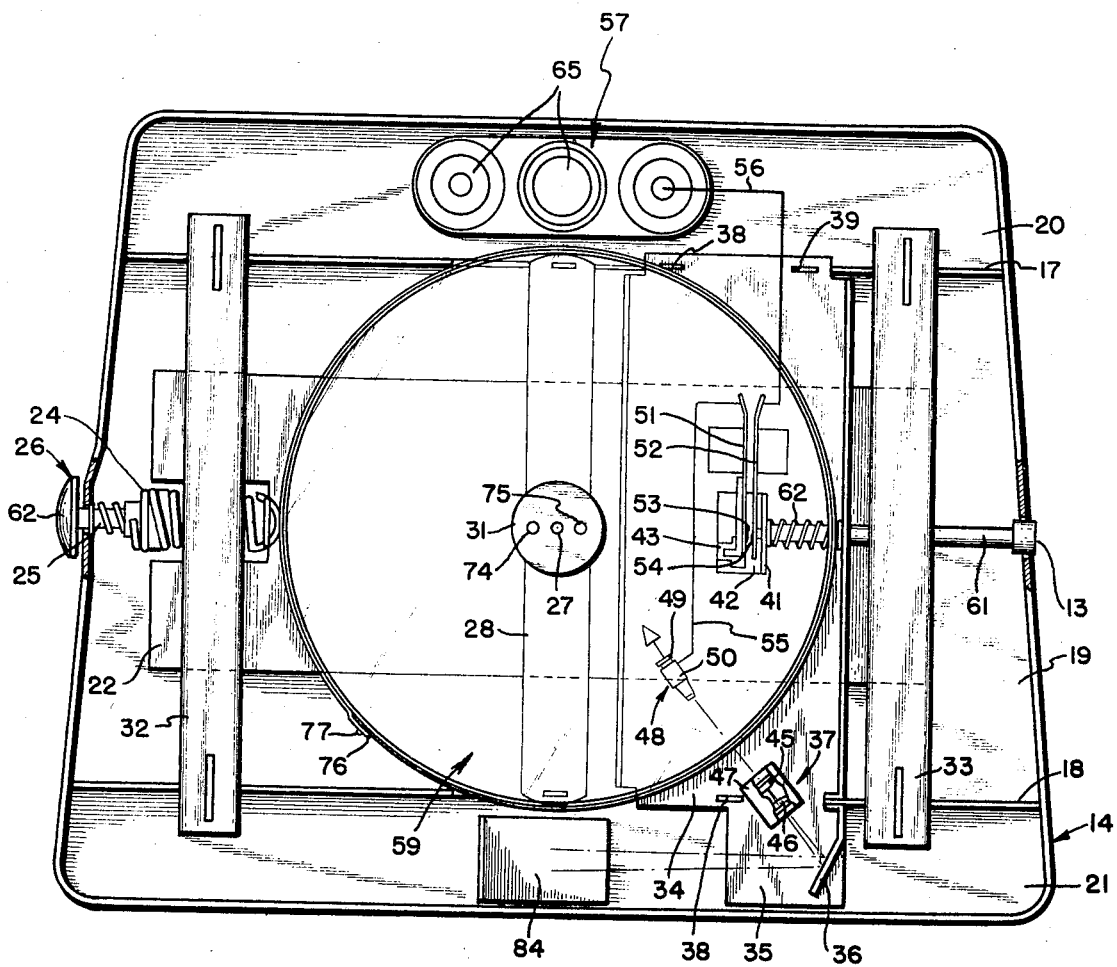
FIG. 5 is a top plan view of the bathroom scale of FIG. 1 with its platform removed.

Referring now to the drawings, in FIG. 1 there is illustrated a bathroom scale 10 exemplary of the invention, including a projected dial system for projecting an illuminated and enlarged numerical indication of the weight of the party using it, onto a projection screen 11. Preferably, the scale 10 includes a source of stored power, such as batteries, however, an externally mounted power pack can be used or the scale 10 can be easily modified so that it can be powered from the ordinary 110 v. AC source generally found in the home. The projected dial system is adapted to be activated when a predetermined weight, approximately 10 pounds, is placed on the platform 12 of the scale, and further is adapted to be activated by means of a push-button 13 (FIG. 5), so that the scale can be readjusted to zero setting, without having to apply weight to the platform 12. The operation of its weighing mechanism therefore is not adversely affected or influenced, when the scale is zeroed. Each pound weight is indicated numerically, by means of large, legible numerals, and half-pound weights can be indicated graphically, if desired, so that the indicated weight can be easily read and determined.

Figure 6:
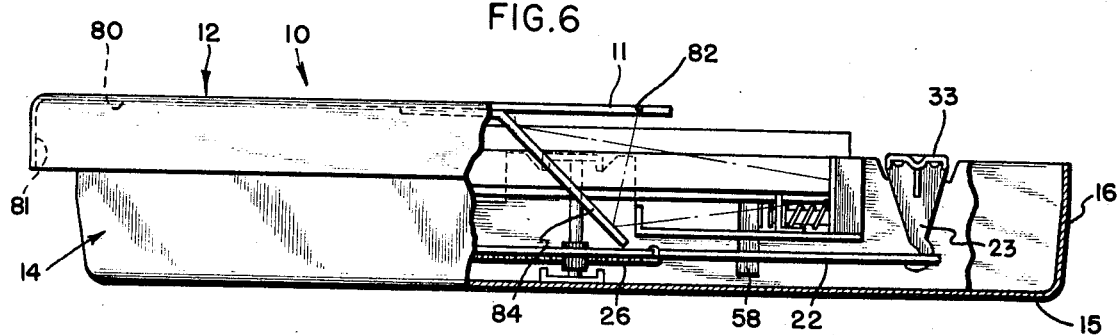
FIG. 6 is an end plan view of the bathroom scale of FIG. 1, partially broken away to illustrate its construction.

More specifically, the bathroom scale 10 includes a base 14 and a platform 12 which together form a housing for protectively enclosing the weighing mechanism and the projected dial system thereof. The base 14, as can be best seen in FIG. 6, is generally dish-shaped, having a bottom wall 15 and upstanding side walls 16. A pair of vertically disposed wall supports 17 and 18 are fixedly secured within the base 14 and divide the same into a centrally disposed compartment 19 which is flanked by two smaller compartments 20 and 21.

The weighing mechanism of the scale 10 is of the generally well-known type disclosed in United States Pat. 2,228,874, and reference can be made to this patent for a complete description of its construction and operation. Generally, however, the weighing mechanism includes an equalizer plate 22 (FIGS. 5 and 6) which is disposed within the compartment 19 and is supported at each of its opposite ends for movement in a substantially horizontal plane below the platform 12, by means of legs 23 depending from a pair of spaced-apart rocker members 32 and 33. A weight spring 24 is affixed to one end of the equalizer plate 22 and to the end of a zero adjusting screw 25. The weight spring 24 resists the movement of the equalizer plate 22, and the zero adjusting screw 25 permits the scale to be readily and easily adjusted so as to correctly indicate zero, when there is no weight disposed on the platform 12, in the manner described more fully below. A gear rack 26 is supported on the equalizer plate 22 for longitudinal sliding movement, and is drivingly engaged with a pinion gear (not shown) affixed to the end of a shaft 27. This shaft 27 is rotatably supported in a vertically disposed position by means of an upper and a lower channel member 28 (only one of which can be seen). A dial wheel 31 is affixed to the end of the shaft 27 and is rotatably driven by it, when the equalizer plate 22 and the gear rack 26 are moved. The gear rack 26 is supported on the equalizer plate 22 in a fashion such as to cushion the forces transmitted from the gear rack 26 to the pinion gear affixed to the shaft 27, when a weight is suddenly placed on or removed from the platform 12, in the manner fully described in the above-mentioned United States Pat. 2,228,874. The rocker members 32 and 33 are pivotally supported atop the wall supports 17 and 18, and the platform 12 seats atop them. When weight is applied atop the platform 12, the rocker members 32 and 33 are pivotally operated to, in turn, move the equalizer plate 22 and the gear rack 26. The gear rack 26, in turn, drivingly engages the pinion gear affixed to the shaft 27, and causes the latter and the dial wheel 31 affixed to it to rotate.

A component support plate 34 spans between the wall supports 17 and 18 and is fixedly secured atop them, as illustrated in FIG. 5. A reflector platform 35 having a vertically disposed, angularly oriented reflector 36 integgrally formed or otherwise affixed to it is disposed within the compartment 21. This reflector platform 35 can be a separate member which is fixedly secured to the component support plate 34 or to the bottom wall 15 of the base 14. Preferably, however, it is formed as an integral part of the component support plate 34 so that both members can be simultaneously aligned and affixed within the scale 10. This can be accomplished by, for example, merely extending alignment and securing tabs 38 integrally formed with the wall supports 17 and 18 along the upper edges thereof, through slots 39 formed in the component support plate 34 and bending the tabs 38 to overlap the edges of the slots.

The component support plate 34 also has upstanding flanges 40 and 41 formed along its one outer edge and along one edge of an opening 42 in it, respectively.

A magnifying and projection lens system 37 including a pair of lenses 45 and 46 which advantageously can be mounted within a lens mount 47 and a lamp assembly 48 including a socket 49 and a lens-end lamp 50 are positionally affied to the component support plate 34 in a fashion such as to project the numerical indicia 60 on a dial 59 (FIG. 3) onto the reflector 36, and from there onto the projection screen 11, in a manner described more fully below. The lens-end lamp 50 can be a G.E. 260 subminiature lamp manufactured by the General Electric Company, or its equivalent. A pair of contact arm 51 and 52 having contacts 53 and 54 thereon, respectively, are electrically insulated from the component support plate 34 and are affixed to the latter so that they extend over the opening 42. The contact arm 51 is electrically coupled by a conductor 55 to the lamp 50, and the socket 49 for the latter is grounded to the base 14, through the component support plate 34 and the wall supports 17 and 18. The other contact arm 52 is electrically coupled by means of a conductor 56 to one terminal of a power source 57, described more fully below. The other terminal of the power source 57 is grounded to the base 14, so that an electrical circuit for energizing the lamp 50 is provided, when the contacts 53 and 54 are closed.

A contact bar (FIG. 6) is affixed to the contact arm 51, and extends substantially vertically downwardly through the opening 42 in the component support plate 34 and a slotted opening 43 in the equalizer plate 22. The arrangement is such that the edge of the slotted opening 43 engages the contact bar 58 when there is no weight applied to the platform 12 and holds the contact arm 51 in a position such that the contacts 53 and 54 normally are open. When weight is applied to the platform 12 and the equalizer plate 22 is moved, in the manner described above, the contact bar 58 is disengaged from the edge of the slotted opening 43 and the contact arm 51, which is biased toward the contact arm 52 is permitted to move to close the contacts 53 and 54.

A push-button 13 is affixed to a shaft 61, and the latter is extended through and retained within apertures formed in the side wall 16 of the base 14 and the flanges 40 and 41 of the component support plate 34 in a fashion such that its end will engage and will move the contact arm 52 to close the contacts 53 and 54, when the push-button 13 is depressed. A spring 62 disposed about the shaft 61 and retained between the flanges 40 and 41 functions to normally bias the shaft 61 in the inoperative position. The push-button 13, as indicated above, is provided to activate the illuminated projected dial system so that the scale 10 can be readjusted to a zero setting without the need of applying weight to the platform 12.

The power source 57, as illustrated in FIG. 5, comprises three batteries 65 which can be C or D cells removably contained within housing of the scale 10, formed by the platform 12 and the base 14. Alternatively, the base 14 of the scale 10 can be provide with sockets 64 for receiving a plug-in power pack 73 including three D cell batteries 63, as illustrated in FIG. 10 (only two of the batteries are visible). In cases where larger batteries such as D cell are used, a voltage regulator 69 preferably is provided in the circuitry for energizing the lamp 50, as illustrated in FIG. 10, to assure longer lamp life and to maintain the voltage within a desired range such as 3.0–0.25 v. so that the psychological effect of lamp dimming can be controlled.

The dial 59 of the scale 10, as can be best seen in FIGS. 3, 5 and 11, comprises a circular-shaped drum 66 having a top wall 67 and an annular side wall 68. The numerical indicia 60 is provided about the annular side wall 68, in a manner described more fully below. The drum 66 preferably is formed of a transparent plastic such as crystal clear polystyrene, and has a shaft receiving aperture 70 and two alignment pin apertures 71 and 72 formed in its top wall 67. The dial 59 is affixed to the dial wheel 31 by extending the shaft 27, which is threaded on its end, through the shaft receiving aperture 70 and affixing a threaded nut (not shown) to it. The two alignment pins 74 and 75 on the dial wheel 31 are extended through respective ones of the alignment pin apertures 71 and 72, to align the dial 59 and to prevent it from rotating with respect to the dial wheel 31.

The numerical indicia 60 can be easily provided on the dial 59, by forming the same on a film strip 76 such as a length of standard 8 mm. film. A 16 mm. film also can be used and, in such cases, two rows or columns of the numerical indicia 60 are formed on it and the film strip is then divided in half to form or to provide two of the film strips 76. The film strip 76 can be affixed about the annular side wall 68 in any suitable fashion. Advantageously, however, a number of spaced-apart projections 77 can be formed about the periphery of the annular side wall 68, in positions such that they can be extended through the spaced-apart apertures normally formed in standard 8 or 16 mm. film, to affix the film strip 76 to the dial 59, as illustrated in FIG. 11.

Preferably, the film strip 76 is supported over its entire width by the annular side wall 68 of the drum 66, as illustrated in FIG. 11, so that the film strip will not distort. When supported in this fashion, the light of the lamp 50 must pass through the side wall 68. Normally, this will result in a slight decrease in the brilliancy of the numerals projected onto the projection screen 11, however, this decrease generally is of no particular concern so long as the side wall 68 is of a crystal clear material. Alternatively, the film strip 76 can be supported in a fashion such that the portion thereof having the numerical indicia 60 formed on it extends below the lower edge of the side wall, as illustrated in FIG. 12. The light of the lamp 50 then is impinged on and passes through just the film strip 76. In such case, the length of the side wall 68 can be shortened so that 8 mm. film can still be used or, alternatively, 16 mm. film is used and the numerical indicia 60 is provided on that portion of it which extends below the lower edge of the side wall.

The numerical indicia 60 is provided on the film strip 76 and the latter is affixed to the dial 59 so that the numerals are vertically disposed on the exterior surface of the dial, as can be best seen in FIG. 2. Each pound weight is numerically indicated and, if desired, half-pound weights can be graphically indicated with, for example, straight lines disposed between each of the numerals. In the illustrated embodiment, the dial 59 rotates in a CCW direction, as seen from the top, and the film strip 76 is affixed to it so that the numerical indica increases in value as the dial is traversed in a counter-clockwise direction. The film strip 76 preferably extends completely about the side wall 68, with its opposite ends overlapped and fixedly secured to one of the projections 77, as can be best seen in FIG. 5. In the illustrated embodiment, the numerical indicia 60 increases from 0 to 300, and extends about only approximately a 300° segment of the dial, since rotation of the dial is restricted to approximately this same degree of rotation.

The platform 12 of the scale 10, as can be best seen in FIGS. 1 and 6, has a top wall 80 and side walls 81 which are proportioned so that the side walls 81 overlap the side walls 16 of the base 14 when the top wall 80 is seated upon the rocker members 32 and 33. The top wall 80 has a window opening 82 (FIGS. 1 and 6) formed in it, which is covered by the projection screen 11. The projection screen 11 can be of glass or plastic and preferably is matted so that it generally opaque and will function as a surface against which the numerical indicia 60 can be projected and observed. A horizontal reflector 84 is affixed to the underside of the top wall 80 and is disposed at an angle of approximately 45° with respect to the reflector 36, for projecting the numerical indicia 60 onto the projection screen 11, in a manner described more fully below. Alternately, the reflector 84 can be affixed to the bottom wall 15 of the base 14 or it can be formed as an integral part of the reflector platform 35 or the component support plate 34.

The operation of the scale 10 generally can be described as follows. When weight is applied to the platform 12, for example, when a person stands on it, the rocker members 32 and 33 are caused to pivot. The rocker members in turn, cause the equalizer plate 22 and the gear rack 26 to move. As the gear rack moves, it drivingly engages the gear (not shown) affixed to the shaft 27 and causes the latter and the dial wheel 31 and the dial 59 which are affixed to it to rotate. The dial 59 and the film strip 76 affixed to it are oriented in such a manner as to cause the appropriate numerical indicia 60 to be positioned in front of the lamp 50 so that it will be projected onto the projection screen 11, when the lamp 50 is energized.

The leg of the contact bar 58 is disengaged from the edge of the slotted opening 43 formed in the equalizer plate 22 so as to permit the contact arm 51 to move to close the contacts 53 and 54, when the equalizer plate 22 is moved, as illustrated in FIG. 7. The contacts 53 and 54, in closing, energize the lamp 50 and thereby cause light to be impinged on the film strip 76 affixed to the side wall 68 of the dial 59. The image of the numeral corresponding to the weight on the platform 12 is projected onto the lens 45 of the magnifying and projection lens system 37 which inverts, magnifies and projects it onto the vertically disposed reflector 36 in a fashion such that the numeral appears inverted and reversed on the latter. From the reflector 36, the numeral is reflected onto the reflector 84. This reflector 84 is horizontally disposed and is at an angle of approximately 45° with respect to the vertical plane of the reflector 36 so that the numeral is expanded or stretched, and therefore effectively further magnified, and is projected vertically upwardly onto the rear of the projection screen 11. In the process, the numeral further is rotated and properly oriented so that it is horizontally disposed on the projection screen 11, as illustrated in FIG. 1. The apparent movement of the numerals, as the dial 59 is rotated, is across the projection screen 11 from the top to the bottom of the scale 10.

When the weight is removed from the platform 12, the equalizer plate 22 and the gear rack 26 are returned to their initial inoperative positions. The leg of the contact bar 58 is again engaged by the edge of the slotted opening 43 and moves the contact arm 51 to again open the contacts 53 and 54 so that the lamp 50 is de-energized.

From the above description, it can be seen that the arrangement of the dial 59 and the lamp 50, the magnifying and projection lens system 37, and the reflectors 36 and 84 is such that an enlarged, illuminated image of the numerically indicated weight can be projected onto the projection screen 11, without the necessity of elevating the latter above the surface of the platform 12. Accordingly, the surface of the platform 12 can be flat or substantially flat, without any upstanding projections or obstructions on it.

To readjust the scale 10 to its zero setting, the push-button 13 is pressed and this action engages the end of the shaft 61 with the contact arm 52 to move the latter to close the contacts 53 and 54, as illustrated in FIG. 8. The contacts 53 and 54, in closing, energize the lamp 50 and a numeral is projected onto the projection screen 11, in the manner described above. The zero adjusting screw 25 is rotated, which action adjustably positions the spring 24 in a fashion such as to adjustably position the equalizer plate 22, until the numeral "0" is viewed on the projection screen 11. The push-button 13 then is released, to extinguish the lamp 50.

This feature can be eliminated, if desired, so that a less expensive scale can be provided. In such a case, the push-button 13, the shaft 61 and the spring 62 are simply eliminated, and the aperture in the side wall 16 of the base 14 can be closed with an appropriate button-type plug (not shown). Also, a non-conductive plug 85 preferably is affixed within the aperture in the contact support flange 41 and is affixed to the contact arm 52 to hold the latter in fixed relationship to the contact arm 51, as illustrated in FIG. 9. The contact arm 52 thereby is prevented from becoming mis-aligned with the contact arm 51, after an extended period of use.

In FIG. 2 there is illustrated another bathroom scale 90 constructed in accordance with a second and less desirable embodiment of the invention. The bathroom scale 90 includes a dial projection system, however, the construction of the latter is different from that of the scale 10 described above and requires the use of an elevated projection screen 92, the latter being disposed atop and forming the top wall of a hood 91, as illustrated in FIG. 2.

The scale 90 includes a weighing mechanism like that of the scale 10, however, a dial 94 (FIG. 4) in the form of a flat circular-shaped disc is affixed to and rotated by the dial wheel 31 thereof, in the same manner as the dial 59 is rotated. This disc-shaped dial 94 is transparent and as can be best seen in FIGS. 1 and 13, has numerical indicia 95 provided on it, in the form of an annular ring which is spaced from its peripheral edge. The numerical indicia 95 is arranged in vertical columns so as to read from the outer edge toward the center of the dial 94, and increases in value as the dial is traversed in a clockwise direction, from 0 to 300. As in the case of the dial 59, the numerical indicia 95 extends about only approximately a 300° segment of the dial 94.

The illumination for lighting the dial and for projecting the numerical indicia is provided by means of an ordinary filament lamp 96. This lamp 96, as illustrated in FIGS. 13 and 14, is disposed within the compartment 21 of the base 14 and the electrical circuitry for and the manner of energizing it can be the same as that for the lamp 50 of the scale 10. A pair of condensing lenses 97 and 98 also are affixed within the compartment 21 and are arranged to focus the light emitted by the lamp 96 onto a reflector 99 which can be, for example, a mirror or a right-angle prism. The reflector 99, in turn, is arranged to reflect the light through the dial 94, as illustrated in FIG. 14, and to project the numerical indicia 95 onto and through a projection lens 100. The latter inverts and projects the image of the numerical indicia 95 onto the projection screen 92. The numerals appear to move from right to left across the projection screen 92 as the dial 94 is rotated and, further, are disposed in a vertical column, as can be best seen in FIG. 15, rather than being horizontally disposed, as in the case of the scale 10. Since the light from the lamp 96 is projected through the dial 94 and the latter is disposed horizontally beneath and parallel to the top wall 80 of the platform 12, the numerical indicia 95 would not be magnified to any appreciable extent as it is projected on to the projection screen 92. If the latter is disposed flush with the top wall 80 of the platform, as in the case of the projection screen 11 of the scale 10. The projection screen 92 therefore must be elevated, by means of a hood 91 or other support structure, in order to project a magnified or enlarged image of the numerals onto it. The necessity of this hood 91 detracts from the aesthetic appearance of the scale and, furthermore, makes the scale more difficult to store. In addition, the hood 91 creates an obstacle which people tend to trip over.

In FIG. 16, there is illustrated still another bathroom scale 110 which is generally like the scale 90. In this case, the lamp 96, the condensing lenses 97 and 98, and the reflector 99 are eliminated and replaced by a lense-end lamp 111 which is vertically disposed directly below the dial 94. The lense end lamp 111 can be a G. E. 260 sub-miniature lamp of the type sold by General Electric Company. The light emitted by a lamp of this type is sufficiently concentrated in a beam so that the light can be impinged directly onto the dial 94, to project the image of the numerals through the projection lens 100, onto the projection screen 92.

The projection screen can be tinted so as to highlight the numerical representing the weight placed on the platform, from the other numerals which may appear on the projection screen. This is illustrated in FIG. 15 wherein the projection screen 92 is tinted over the rectangular-shaped areas 101 and 102 flanking the centrally disposed area 103. The numeral, such as the numeral 150 illustrated, is highlighted so that it stands out from the numerals 149 and 151 which also appear on the projection screen, under the tinted areas 101 and 102, respectively.

In FIGS. 17 and 18, there is illustrated still another bathroom scale 120 including a scale body 121 and a detached, elevated projection screen 122. The scale body 121 can be constructed like either of the two scales 10 and 90, adapted however, to project the dial indicia vertically upwardly onto the projection screen 122.

The projection screen 122, as can be best seen in FIG. 18, can be affixed within the top of a single housing 123 which can be, for example, molded of plastic. The housing 123 further is adapted to be removably affixed to a support hanger 124 which is fixedly secured to the wall or other object. The housing 123 therefore can be removed, when not in use, if desired.

In operation, the dial indicia is projected, in the manner described above, through the aperture 125 in the platform of the scale. The housing 123 preferably is mounted about waist-level, and the projected dial indicator system is adapted to project the image onto the rear of the projection screen 122, so that the indicia can be viewed and read on its top.

It can be seen from the above description that the bathroom scales satisfy each of the objectives set forth above, in that they comprise the same housings presently being used and that the dial projection systems are incorporated therein and adapted to function with the weight mechanism theerof with little modification to the latter. In each case, an enlarged, illuminated numerical weight indication which can be easily read is projected onto the projection screen which, in the case of the bathroom scale 10, can be flush with the top surface of the scale's platform.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Now that the invention has been described, what is claimed as new and desired to be secured by Letters Patent is:

1. A low-profile, portable bathroom scale comprising, in combination: a base; a movable platform associated with said base for receiving an object to be weighed; a weight mechanism having a rotatable shaft and being responsive to the movement of said platform to rotate said shaft; a dial mounted on said shaft so as to extend substantially horizontally below said platform and having indicia of weight values provided on it; a projection screen mounted on and movable with said platform as the latter is operated; a dial projection system including means for illuminating and projecting an enlarged image of a portion of said indicia onto said projection screen for visual observation of the weight of the object placed on said platform; and switch means operated responsive to the operation of said weight mechanism for activating said dial projection system.

2. The bathroom scale of claim 1, wherein said projection screen is affixed to said platform substantially flush with the top surface thereof.

3. The bathroom scale of claim 1, wherein said projection screen is affixed to said platform at a height above the top surface thereof.

4. The bathroom scale of claim 1, further including adjustment means for readjusting said weight mechanism to a zero setting, and means operable to operate said switch means to activate said dial projection system independently of the operation of said weight mechanism to permit said weight mechanism to be readjusted to said zero setting without the necessity of applying weight to said platform.

5. The bathroom scale of claim 1, wherein the indicia of weight values includes a numeral for each pound weight, said numerals being projected onto said projection screen.

6. The bathroom scale of claim 1, wherein said dial comprises a flat circular-shaped disc having said indicia provided on it about and adjacent to its peripheral edge, said projection screen being affixed to said platform at a height above the top surface thereof and forming at least a portion of the top wall of a closed hood affixed to said platform, said dial projection system being adapted to project an enlarged image of said indicia onto said projection screen.

7. The bathroom scale of claim 6, wherein said dial projection system comprises lens means supported within said hood beneath said projection screen and a lens-end lamp vertically disposed beneath said dial and aligned with said lens means so as to project a beam of light on said dial to project the image of said indicia on said lens means and from the latter onto said projection screen.

8. The bathroom scale of claim 6, wherein said dial projection system comprises lens means supported within said hood beneath said projection screen, a source of light, a reflector disposed to reflect a beam of light from said source of light on said dial to project the image of said indicia on said lens means and from the latter onto said projection screen, and condenser lens means for projecting a concentrated beam of light from said source of light onto said reflector.

9. The bathroom scale of claim 1, wherein said dial comprises a top wall and an annular side wall, said indicia of weight values being disposed about the periphery of said annular side wall, and wherein said dial projection system comprises projection and magnifying lens means, a source of light for projecting a light beam through said annular side wall and for projecting an image of said indicia on said projection and magnifying lens means, reflector means positioned with respect to said projection and magnifying lens means and to said projection screen such that an enlarged image of said indicia is projected by said projection and magnifying lens means on said reflector means and is reflected by said reflector means onto said projection screen.

10. The bathroom scale of claim 9, wherein said indicia of weight values comprises numerals disposed about the periphery of said annular side wall, the digits of each of said numerals being vertically aligned in a column on their sides, said dial projection system being arranged to orient and to project said digits onto said projection screen in horizontal alignment to provide a horizontal read-out of said numerals.

11. The bathroom scale of claim 10, further including a negative photographic film strip of a predetermined length having said indicia of weight values provided on it, said film strip being affixed about said annular side wall of said dial so as to extend below the lower edge of said annular side wall, said source of light being adapted to project a light beam through said film strip.

12. The bathroom scale of claim 10, further including a negative photographic film strip of a predetermined length having said indicia of weight values provided on it, said film strip being affixed about and supported by said annular side wall of said dial.

13. The bathroom scale of claim 12, wherein said film strip has a plurality of opertures formed in it in spaced relation along its length and adjacent one edge thereof, and wherein said annular side wall has a plurality of spaced projections provided on it about its periphery which are adapted to extend through said apertures in said film strip to affix said film strip to said annular side wall.

14. A bathroom scale comprising, in combination: a base; a movable platform associated with said base for receiving an object to be weighed; a weight mechanism having a rotatable shaft and being responsive to the movement of said platform to rotate said shaft; a dial mounted on said shaft and having indicia of weight values provided on it; a projection screen mounted so as to not project above the top surface of said platform; a dial projection system for illuminating and projecting an enlarged image of a portion of said indicia onto said projection screen for visual observation of the wieght of the object placed on said platform; and switch means operated responsive to the operation of said weight mechanism for activating said dial projection system; said dial comprising a top wall mounted on said shaft so as to extend substantially horizontally below said platform and an annular side wall depending vertically downwardly and having said indicia of weight values formed thereon about its peripheral surface, said dial projection system including a source of light disposed beneath said top wall of said dial and within the confines of said annular side wall thereof, a first and a second reflecting surface, a projection and magnifying lens system disposed outside of the confines of said annular side wall of said dial and between said source of light and said first reflecting surface, said source of light projecting an image of said indicia on said projection and magnifying lens system and the latter projecting an enlarged image of said indicia on said first reflecting surface, said first reflecting surface being disposed to reflect said enlarged image of said indicia on said second reflecting surface and the latter being disposed to reflect said enlarged image of said indicia on said projection screen.

15. The bathroom scale of claim 14, wherein said indicia of weight values includes numerals, the digits of each of said numerals being vertically aligned in a column on their sides, said projection and magnifying lens system projecting an enlarged, inverted and reversed numeral on said first reflector surface, said first reflector surface being vertically disposed and being at an angle with respect to the projection path of said projection and magnifying lens system so as to project said numerals on said second reflector surface, said second reflector surface being horizontally disposed and being at an angle with respect to the vertical plane of said first reflector surface so as to rotate, properly orient and reflect said numeral vertically upwardly on said projection screen.

16. The bathroom scale of claim 15, wherein said source of light comprises a lens-end lamp, whereby its light beam is concentrated and projected on said indicia.

17. A low-profile, portable bathroom scale comprising, in combination: a base; a platform movably affixed to said base for receiving an object to be weighed; a weight mechanism having a rotatable shaft and being responsive to the movement of said platform to rotate said shaft; a dial mounted on said shaft so as to extend substantially horizontally below said platform and having indicia of weight values provided on it; a projection screen affixed to and movable with said platform as the latter is operated; a dial projection system including means for illuminating and projecting an enlarged image of a portion of said indicia onto said projection screen for visual observation of the weight of the object placed on said platform; and switch means operated responsive to the operation of said weight mechanism for activating said dial projection system; said base and said platform together forming a housing for protectively enclosing said weight mechanism, said dial and said dial projection system.

References Cited

UNITED STATES PATENTS

| 1,721,398 | 7/1929 | Jacob | 177—178 X |
| 2,343,621 | 3/1944 | Williams | 177—178 X |
| 2,566,711 | 9/1951 | Wells et al. | 177—178 X |
| 3,181,633 | 5/1965 | Worst. | |

FOREIGN PATENTS

| 554,105 | 1/1957 | Belgium. |
| 941,863 | 1/1949 | France. |
| 800,289 | 9/1950 | Germany. |

STEPHEN J. TOMSKY, Primary Examiner

G. H. MILLER JR., Assistant Examiner

U.S. Cl. X.R.

353—40